US008469518B2

(12) United States Patent  
Togawa

(10) Patent No.: US 8,469,518 B2  
(45) Date of Patent: Jun. 25, 2013

(54) IMAGE PROJECTION DEVICE, CONTROL METHOD THEREFOR, AND INFORMATION STORAGE MEDIUM

(75) Inventor: Keiji Togawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 190 days.

(21) Appl. No.: 12/429,557

(22) Filed: Apr. 24, 2009

(65) Prior Publication Data

US 2010/0007798 A1 Jan. 14, 2010

(30) Foreign Application Priority Data

Jul. 14, 2008 (JP) ................................. 2008-182435

(51) Int. Cl.  
*G03B 21/14* (2006.01)

(52) U.S. Cl.  
USPC ............................................. 353/28; 353/121

(58) Field of Classification Search  
USPC ............................. 353/28, 121, 122; 382/167  
See application file for complete search history.

(56) References Cited

U.S. PATENT DOCUMENTS

| 7,061,547 | B2 * | 6/2006 | Wada | 348/602 |
| 7,110,002 | B2 * | 9/2006 | Wada | 345/600 |
| 7,221,792 | B2 * | 5/2007 | Matsuda et al. | 382/167 |
| 7,339,596 | B2 * | 3/2008 | Tajima | 345/600 |
| 7,822,269 | B2 * | 10/2010 | Tsukada | 382/167 |
| 7,929,758 | B2 * | 4/2011 | Cho et al. | 382/167 |
| 8,256,900 | B2 * | 9/2012 | Bitetto | 353/28 |
| 2004/0150835 | A1 * | 8/2004 | Frick et al. | 356/601 |
| 2006/0018535 | A1 * | 1/2006 | Oon et al. | 382/167 |
| 2006/0082740 | A1 * | 4/2006 | Radhouane | 353/122 |
| 2007/0236671 | A1 * | 10/2007 | Bitetto | 353/122 |
| 2008/0013057 | A1 * | 1/2008 | Bullock | 353/121 |
| 2008/0043205 | A1 * | 2/2008 | Lonn | 353/69 |
| 2009/0153749 | A1 * | 6/2009 | Mixon | 348/744 |

FOREIGN PATENT DOCUMENTS

| JP | 10-311732 | 11/1998 |
| JP | 2004-229290 | 8/2004 |
| JP | 2005-168892 | 6/2005 |
| JP | 2006-189712 | 7/2006 |
| JP | 2006-201548 | 8/2006 |
| JP | 2007-116306 | 5/2007 |
| JP | 2007-226766 | 9/2007 |
| JP | 2007-304284 | 11/2007 |
| JP | 2008-67080 | 3/2008 |

OTHER PUBLICATIONS

Japanese Office Action dated Oct. 2, 2012, from corresponding Japanese Application No. 2008-182435.

* cited by examiner

*Primary Examiner* — William C Dowling  
(74) *Attorney, Agent, or Firm* — Katten Muchin Rosenman LLP

(57) ABSTRACT

An image projection device includes: an imaging section for capturing an image; and a projection section for projecting an image. The image projection device detects a color in a captured image which is captured by the imaging section, and controls, based on the detected color in the captured image, contents of the image which is projected by the projection section at a position at which the captured image has been captured.

7 Claims, 3 Drawing Sheets

| DISPLAY ELEMENT | COLOR COMPONENT VALUE |
|---|---|
| CHARACTER OBJECT O1 | (H1, S1, V1) |
| CHARACTER OBJECT O2 | (H2, S2, V2) |
| ⋮ | ⋮ |

IMAGE PROJECTION DEVICE, CONTROL METHOD THEREFOR, AND INFORMATION STORAGE MEDIUM

BACKGROUND OF THE INVENTION

1. Field of the Invention

The present invention relates to an image projection device for projecting and displaying an image, a control method therefor, and an information storage medium.

2. Description of the Related Art

There is known an image projection device provided with projection means such as a projector. According to the image projection device as described above, more realistic images can be attained not only by displaying, for example, a game image of a video game on a screen of a display device, but also by projecting the image to surroundings of a user, such as a floor and a wall inside a room (for example, JP 2005-168892 A).

SUMMARY OF THE INVENTION

In a case where the image projection device as described above is used in, for example, a living room of an ordinary house, a projection surface such as a floor or a wall is not always white and may consist of diverse background colors. For that reason, depending on a relationship between the background color of the projection surface and a color of a display element, such as a game character within a projected image, visibility of the image may be deteriorated. For example, the display element within the image may become indistinguishable.

The present invention has been made in view of the above-mentioned circumstances, and therefore an object thereof is to provide an image projection device capable of preventing deterioration of visibility in a case where an image is projected onto a projection surface such as a floor or a wall, a control method therefor, and an information storage medium.

In order to achieve the above-mentioned object, an image projection device according to the present invention includes: imaging means for capturing an image; projection means for projecting an image; color detection means for detecting a color in a captured image which is captured by the imaging means; and projected image control means for controlling, based on the detected color in the captured image, contents of a projected image which is projected by the projection means at a position at which the captured image has been captured.

Further, in the image projection device, the projected image control means may determine, based on the detected color in the captured image, attribute information of a display element contained in the projected image, and generate the projected image containing the display element according to the determined attribute information.

Further, the attribute information of the display element may include a color of the display element.

Further, the projected image control means may determine a color of each of a plurality of the display elements contained in the projected image so as to be different from one another.

Further, the attribute information of the display element may include an arrangement position of the display element within the projected image.

Further, in the image projection device, the color detection means may calculate statistics of hue values of pixels within the captured image to thereby detect the color in the captured image, and the projected image control means may control the contents of the projected image based on the calculated statistics.

Further, the projected image control means may determine a color of a display element contained in the projected image so that a hue value of the color of the display element is included between an upper limit value and a lower limit value, which are determined based on the calculated statistics, and generate the projected image containing the display element according to the determined color.

Further, according to the present invention, a control method for an image projection device, which includes: imaging means for capturing an image; and projection means for projecting an image, includes: detecting a color in a captured image which is captured by the imaging means; and controlling, based on the detected color in the captured image, contents of a projected image which is projected by the projection means at a position at which the captured image has been captured.

Further, according to the present invention, a computer-readable information storage medium stores a program for causing a computer to function as an image projection device including: imaging means for capturing an image; projection means for projecting an image; color detection means for detecting a color in a captured image which is captured by the imaging means; and projected image control means for controlling, based on the detected color in the captured image, contents of a projected image which is projected by the projection means at a position at which the captured image has been captured.

DETAILED DESCRIPTION OF THE INVENTION

Hereinafter, an embodiment of the present invention is described in detail with reference to the drawings.

Figure 1:
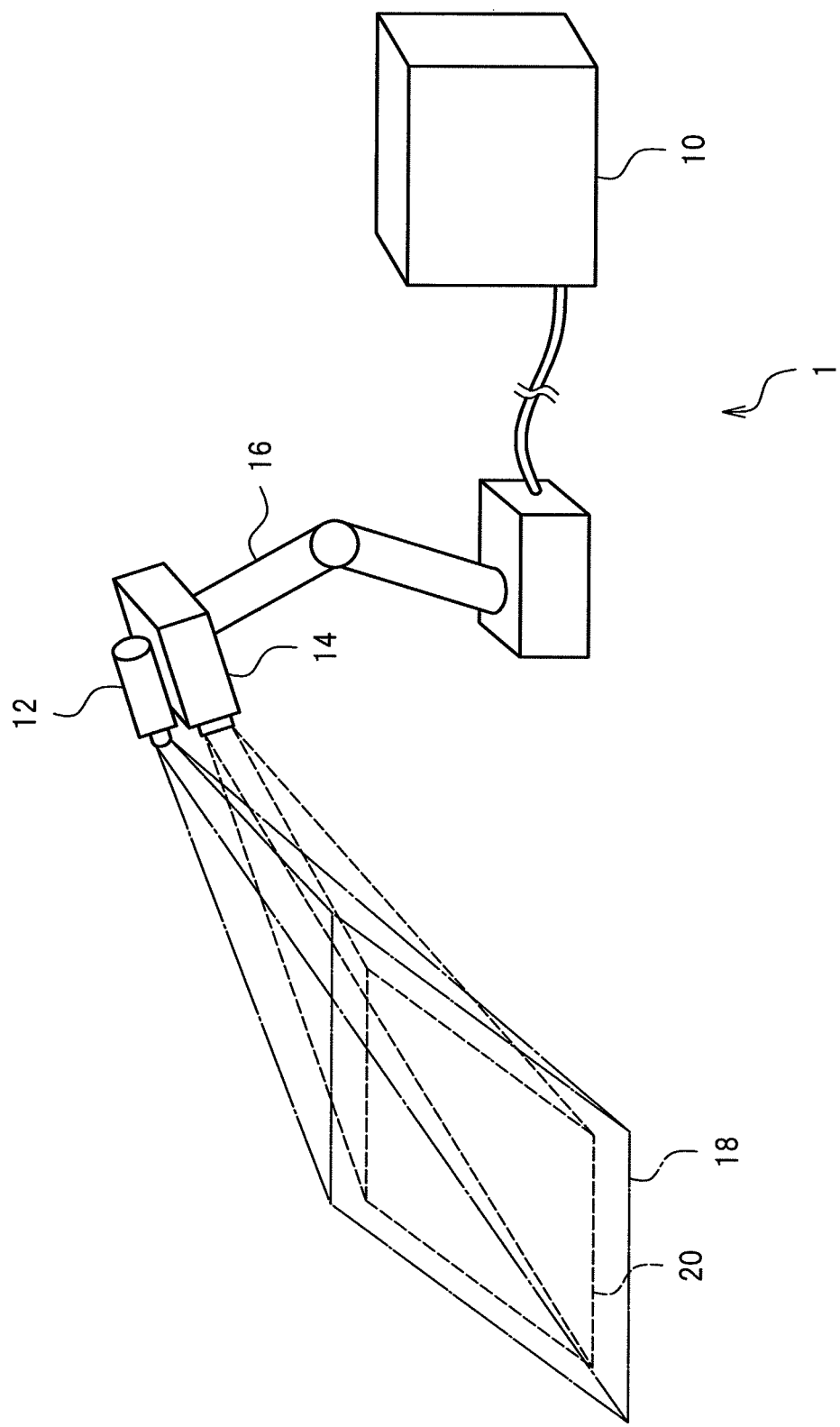
FIG. 1 is a view illustrating an example of an appearance of an image projection device according to an embodiment of the present invention.

FIG. 1 is a view illustrating an example of an appearance of an image projection device 1 according to the embodiment of the present invention. As illustrated in FIG. 1, the image projection device 1 includes a computer 10, a camera 12, a projector 14, and an arm 16.

Figure 2:
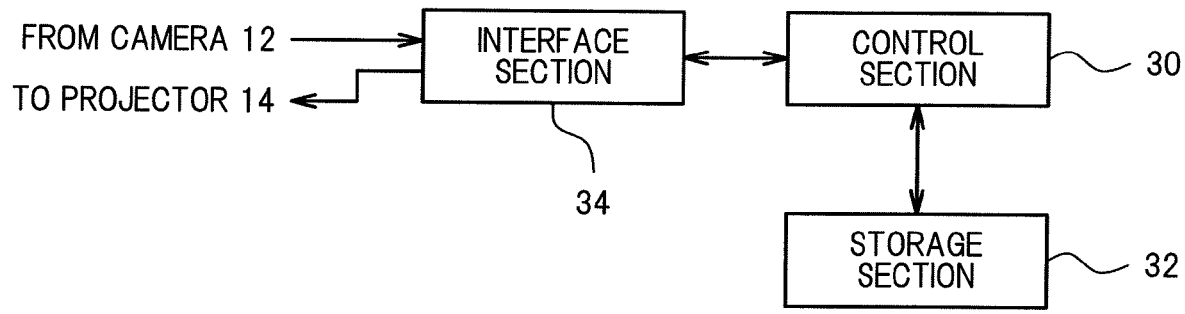
FIG. 2 is a block diagram illustrating a configuration of a computer.

The computer 10 is, for example, a main body of a home-use game machine, and as illustrated in FIG. 2, includes a control section 30, a storage section 32, and an interface section 34.

The control section 30 is, for example, a central processing unit (CPU), and executes various information processing according to a program stored in the storage section 32. The storage section 32 is, for example, a memory device such as a random access memory (RAM) or a read only memory (ROM) or a hard disk, and stores a program executed by the control section 30 and various items of data. Further, the storage section 32 also functions as a work memory of the control section 30.

The interface section 34 is an interface of, for example, a universal serial bus (USB) standard, and relays transmission and reception of data between the camera 12 or the projector 14 and the control section 30. Specifically, the interface section 34 receives, from the camera 12, data of a captured image which has been captured by the camera 12. Further, according to an instruction issued by the control section 30, the interface section 34 outputs to the projector 14 a video signal representing a projected image which is projected by the projector 14.

The camera 12 is an imaging device for capturing a peripheral image. Hereinafter, a range to be imaged by the camera 12 is referred to as an imaging region 18, the range being determined by an imaging direction and a viewing angle of the camera 12. The camera 12 captures an image showing a state within the imaging region 18, and inputs the captured image to the interface section 34.

The projector 14 is a projection device for projecting an image. Hereinafter, a region onto which an image is projected by the projector 14 is referred to as a projection surface 20. The projector 14 projects an image onto the projection surface 20 according to a video signal which is input through the interface section 34. A user views a projected image which is projected onto the projection surface 20 by the projector 14.

The arm 16 supports the camera 12 and the projector 14. Further, the arm 16 may include a drive section such as an actuator so as to change positions and orientations of the camera 12 and the projector 14 according to a control signal which is input by the computer 10. In this manner, when an image is projected by the projector 14, various places such as a floor and a wall can be used as the projection surface 20.

Moreover, the arm 16 may be provided with a pan-tilt mechanism which can change not only the overall position and orientation of the camera 12 and the projector 14, but also the orientation of the camera 12 itself with respect to the projector 14. An imaging direction of the camera 12 with respect to a projection direction of the projector 14, which is changed by the pan-tilt mechanism, is specified, whereby the computer 10 can specify a positional relationship between the projection surface 20 and the imaging region 18.

Figure 3:
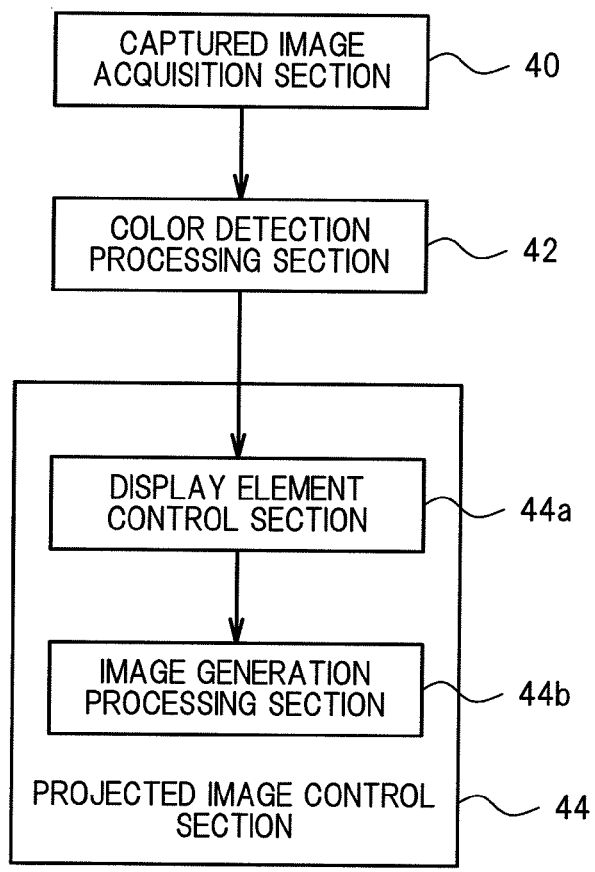
FIG. 3 is a functional block diagram illustrating a functional example of the image projection device according to the embodiment of the present invention.

Hereinafter, a function that the image projection device 1 realizes in this embodiment is described. As illustrated in FIG. 3, the image projection device 1 functionally includes a captured image acquisition section 40, a color detection processing section 42, and a projected image control section 44. Further, the projected image control section 44 includes a display element control section 44a and an image generation processing section 44b. Those functions are realized through execution of a program stored in the storage section 32 by the control section 30. The program may be stored on, for example, various information storage media which are computer-readable such as an optical disk and a memory card to be provided, or may be provided through a communication network such as the Internet.

The captured image acquisition section 40 acquires a captured image by the camera 12. Specifically, for example, before the projector 14 starts to project an image, the captured image acquisition section 40 determines a position of the projection surface 20 onto which the image is projected, and controls the arm 16 so that the imaging region 18 includes the projection surface 20, to thereby change an imaging position of the camera 12. Then, the captured image acquisition section 40 acquires, as a captured image, an image obtained when an image of the imaging region 18 including the projection surface 20 is captured by the camera 12.

The color detection processing section 42 detects a color in the captured image obtained by the captured image acquisition section 40. Specifically, for example, the color detection processing section 42 calculates a hue value of each pixel within the captured image. Then, the color detection processing section 42 calculates statistics of hue values of all pixels. Here, as a specific example of the statistics, a mean value "m" and a variance "v" are calculated. The statistics show the overall color characteristic of the entire captured image.

The projected image control section 44 controls contents of a projected image that the projector 14 projects at a position at which the captured image has been captured, based on a color in the captured image detected by the color detection processing section 42. In this embodiment, specifically, the display element control section 44a determines attribute information such as a color and a position of a display element which is contained in the projected image, and the image generation processing section 44b renders the display element according to the determined attribute information, whereby a projected image is generated.

The display element control section 44a determines attribute information (rendering color of a display element, arrangement position thereof within a projected image, or the like) of each display element contained in a projected image projected by the projector 14, based on a detection result by the color detection processing section 42. Here, the display element is an element forming a part of, or all of the projected image. For example, in a case where a projected image is an image showing a game screen, the display element is a character object, a background object, or a texture which is attached to a part of those objects. Note that the display element to be controlled by the display element control section 44a may be one, or may be multiple.

Figures 4, 5:
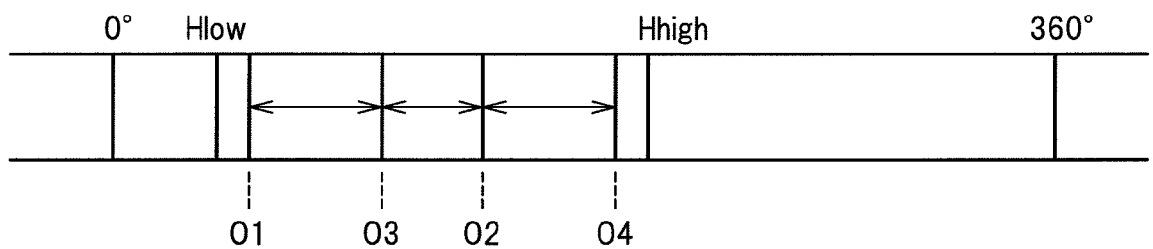
FIG. 4 is a diagram illustrating an example of contents of a color scheme table.
FIG. 5 is an explanatory diagram illustrating a relationship among hue values of colors of objects.

A specific example of processing which is executed by the display element control section 44a is described. In this example, a color scheme table, in which each display element to be rendered is associated with data indicating a color of the display element, is stored in advance in the storage section 32. FIG. 4 illustrates an example of contents of the color scheme table as described above. The display element control section 44a changes, for another color, a color that does not satisfy a predetermined condition regarding a color detected by the color detection processing section 42 among colors of respective display elements stored in the color scheme table. In this case, the condition regarding a color is that a hue value of a color of each display element is, for example, included between an upper limit value Hhigh and a lower limit value Hlow, which are calculated based on the statistics which have been calculated by the color detection processing section 42. The upper limit value Hhigh and the lower limit value Hlow of the hue value are calculated by, for example, the following expressions.

$$\begin{cases} Hhigh = m + A \cdot \sqrt{v} \\ Hlow = m - A \cdot \sqrt{v} \end{cases} \quad \text{[Expression 1]}$$

In those expressions, "m" and "v" are the mean value and the variance calculated by the color detection processing section 42 as described above, and "A" is a predetermined constant number.

A color of each display element is selected so that a hue value thereof is included between the upper limit value Hhigh and the lower limit value Hlow, which are calculated by using the expressions as described above, whereby it is possible to prevent a color which becomes a complementary color with respect to the overall color of a projection surface being used as the color of the display element. When such complementary colors as described above are projected, a subtle color difference between the colors is difficult to distinguish from each other in the projection surface. For that reason, use of such a color is avoided and thus visibility of the display element within the projected image can be improved.

Further, the display element control section 44a may select the color which satisfies the predetermined condition as described above from a plurality of predetermined color candidates with respect to each display element, and store the selected color in the color scheme table. Further, in a case where the predetermined color candidates do not include the above-mentioned color which satisfies the predetermined condition, a value of the predetermined constant number "A" may be increased and the upper limit value Hhigh and the lower limit value Hlow may be calculated again, and thereafter a color candidate that satisfies the condition may be determined.

The image generation processing section 44b generates a projected image which is to be projected by the projector 14 according to the attribute information of each display element, which has been determined by the display element control section 44a. For example, in a case where the display element control section 44a determines a color of each display element contained in a projected image, the image generation processing section 44b renders the display element with the use of the determined color and generates an image to be projected. The generated image is written in a frame buffer memory, and converted into a video signal to be transmitted to the projector 14. With this operation, the projector 14 projects, onto the projection surface 20, the image containing the display element having the color determined according to a color of the imaging region 18 including the projection surface 20.

Hereinafter, another example of a determination method employed when the display element control section 44a determines attribute information of each display element is described.

The display element control section 44a does not individually determine colors of a plurality of display elements to be rendered, but may determine colors of respective display elements so as to be different from each other, if possible, in a range satisfying the predetermined condition. For example, an example in which respective colors of four character objects O1, O2, O3, and O4 are selected from a plurality of color candidates which have been determined in advance with respect to the respective character objects is described. Here, among the color candidates which have been determined in advance with respect to a character object On (n=1, 2, 3, 4), colors having a hue value included between the upper limit value Hhigh and the lower limit value Hlow, which are calculated by the expressions as described above, are represented as Cn(1), Cn(2), . . . , and Cn(NUMn). In this case, NUMn represents the number of color candidates satisfying the above-mentioned condition with respect to the character object On.

In this example, the display element control section 44a calculates evaluation values described below with respect to all possible combinations of four colors (C1($i$), C2($j$), C3($k$), and C4($l$)) ($i=1, \ldots$, NUM1, $j=1, \ldots$, NUM2, $k=1, \ldots$, NUM3, and $l=1, \ldots$, NUM4), which are obtained by selecting one color from each of four groups including: a group of color candidates satisfying the condition with respect to the character object O1; a group of color candidates satisfying the condition with respect to the character object O2; a group of color candidates satisfying the condition with respect to the character object O3; and a group of color candidates satisfying the condition with respect to the character object O4. Then, the display element control section 44a adopts a combination having the smallest calculated evaluation value as colors of character objects used by the image generation processing section 44b in rendering processing. In this case, an evaluation value "Val" is a sum of squares of differences between hue values of colors adjacent to each other when the four colors are arranged in an order of hue values thereof. That is, when the hue values of the four colors are represented as H(1), H(2), H(3), and H(4) in the order of hue values thereof, the evaluation value "Val" is expressed by the expression below.

$$Val = \sum_{i=1}^{3} (H(i+1) - H(i))^2 \qquad \text{[Expression 2]}$$

This evaluation value shows a degree of bias of the hue values.

Alternatively, the display element control section 44a may calculate a variance of the hue values of the four colors as the evaluation value "Val". The evaluation value "Val" in this example is calculated by the following expression by using a mean value $h_{mean}$ of the hue values of the four colors.

$$Val = \sum_{i=1}^{4} (H(i) - h_{mean})^2 \qquad \text{[Expression 3]}$$

In this case, the display element control section 44a adopts a combination having the largest evaluation value "Val" from among the all possible combinations obtained by selecting one color from each of the four color candidate groups as colors of character objects.

As described above, the colors of the character objects are determined, and therefore each of the character objects can be specified easily by a user. FIG. 5 illustrates an example of a relationship among the hue values of the colors of the character objects determined as described above. Note that the display element control section 44a may select colors of respective display elements so as to be different from each other, including other display elements in addition to the character objects.

Further, the color detection processing section 42 not only detects the entire color of the imaging region 18, but may also divide the imaging region 18 into a plurality of partial regions and detects colors of the respective partial regions. The display element control section 44a may determine attribute information of each display element according to the colors of the partial regions. For example, as in a case where a region extending over a boundary between a floor and a carpet laid on the floor is used as the projection surface 20, there may be a case where averaging and evaluating of the entire color of the imaging region 18 is not preferable. In such a case, for example, the color detection processing section 42 analyzes a peak of color distribution of pixels within the captured image or a spreading degree of the distribution, thereby determining whether or not a plurality of regions having colors different from each other are present within the captured image. In a case where it is determined that the plurality of partial regions as described above are present, the captured image is divided into a plurality of partial regions and the color detection processing as described above is performed for each of the partial regions.

In this example, the display element control section 44a calculates, for each partial region, the upper limit value Hhigh and the lower limit value Hlow of the hue value based on a color detected by the color detection processing section 42, and selects, as a color of each display element, a color having a hue value included between the upper limit value Hhigh and the lower limit value Hlow with respect to all the partial regions. In this manner, in a case where an image is projected across a plurality of regions having colors that are different from each other, the display element can be displayed in such a manner that each display element is likely to be specified in any of the regions. Note that in a case where the hue value satisfying the above-mentioned condition is absent because the respective colors of the plurality of regions are significantly different from each other, or in a case where such a hue value is present only in a range having a value less than a predetermined value, for example, a value of the constant number "A" may be increased and the upper limit value Hhigh and the lower limit value Hlow with respect to the respective partial regions may be calculated again. Alternatively, another projection surface 20 may be searched by using the arm 16. Further, regarding the display element such as a background object, which is displayed at a position always fixed within the projected image, a color thereof may be determined based on only a color of a partial region in which the object is displayed.

Further, as described above, in the case where the image is projected across the plurality of regions having colors different from each other, the display element control section 44a may perform a control for changing not only colors of display elements but also arrangement positions of the display elements within an image. For example, regarding a display element such as a background object, which is displayed at a position always fixed within a projected image and whose arrangement position is selectable from among position candidates within the image, its arrangement position may be determined from a plurality of position candidates so that the display element is displayed at a position within partial regions satisfying the above-mentioned condition regarding the hue value. In this manner, an object which cannot be allowed to change its color significantly because of its nature can be contained within the projected image so that visibility thereof is not deteriorated.

According to the embodiment described above, the image projection device 1 controls the contents (for example, color and position of the display element) of the projected image according to the color of the projection surface 20, whereby the visibility of the image to be projected can be prevented from being deteriorated.

Note that the embodiment of the present invention is not limited to the above-mentioned image projection device. For example, in the above-mentioned description, the display element contained in the projected image is focused to control attribute information thereof, but the image projection device 1 may control contents of the entire projected image. For example, in a case where a moving image is projected onto the projection surface 20, through execution of filtering processing to change the entire color tone of the image according to the color of the projection surface 20, an image having excellent visibility may be projected.

Further, in the above-mentioned description, the hue values of the pixels within the captured image are used to evaluate the color of the captured image, but the image projection device 1 may detect the color of the captured image using other parameters. Further, the condition when the color of each display element is determined may be determined by using other various conditions, in addition to the condition in which the hue values are included between the upper limit value Hhigh and the lower limit value Hlow, which are calculated by the above-mentioned expressions.

While there have been described what are at present considered to be particular embodiments of the invention, it will be understood that various modifications may be made thereto, and it is intended that the appended claims cover all such modifications as fall within the true spirit and scope of the invention.

What is claimed is:

1. An image projection device, comprising:
   imaging means for capturing an image of a projection surface before the image projection device illuminates the projection surface;
   projection means for projecting a generated image onto the projection surface, wherein the generated image comprises a plurality of characters;
   color detection means for detecting an overall color characteristic of the captured image of the projection surface, which is captured by the imaging means; and
   projected image control means for determining, based on the detected overall color characteristic, attribute information for the plurality of characters contained in the generated image and controlling the projection means to project the generated image onto the projection surface according to the determined attribute information,
   wherein the color detection means detects the overall color characteristic prior to the projection means projecting a generated image, and
   wherein the projected image control means selects colors for each of the plurality of characters are different from each other and the detected overall color characteristic.

2. An image projection device according to claim 1, wherein the colors selected for each of the characters depends on an arrangement position of the character within the projected image.

3. An image projection device according to claim 1, wherein:
   the color detection means calculates statistics of hue values of pixels within the captured image to thereby detect the overall color characteristic of the captured image; and
   the projected image control means controls the contents of the projected image based on the calculated statistics.

4. An image projection device according to claim 3, wherein the projected image control means selects the colors of at least one of the characters contained in the projected image so that a hue value of the color of the at least one character is included between an upper limit value and a lower limit value, which are determined based on the calculated statistics, and generates the projected image containing the character according to the selected color.

5. A control method for an image projection device comprising:
   imaging means for capturing an image of a projection surface before the image projection device illuminates the projection surface; and
   projection means for projecting a generated image onto the projection surface,
   the control method comprising, wherein the generated images comprises a plurality of characters:
   detecting an overall color characteristic of the captured image of the projection surface, which is captured by the imaging means; and
   determining, based on the detected overall color characteristic, attribute information for the plurality of characters contained in the generated image; and controlling the projection means to project the generated image onto the projection surface according to the determined attribute information, wherein the colors projected for each of the plurality of characters are different from each, other and the detected overall color characteristic, and wherein the detection of the overall color characteristic occurs prior to controlling the projecting means detection mean.

6. A computer-readable information storage medium storing a program for causing a computer to function as an image projection device comprising:

imaging means for capturing an image of a projection surface before the image projection device illuminates the projection surface;

projection means for projecting a generated image onto the projection surface, wherein the generated image comprises a plurality of characters;

color detection means for detecting an overall color characteristic of the captured image of the projection surface, which is captured by the imaging means; and projected image control means for determining, based on the detected overall color characteristic, attribute information for the plurality of characters contained in the generated image and controlling the projection means to project the generated image onto the projection surface according to the determined attribute information wherein the color detection means detects the overall color characteristic prior to the projection means projecting a generated image, and wherein the projected image control means selects colors for each of the plurality of characters are different from each other and the detected overall color characteristic.

7. The control method according to claim 5, wherein the captured image is divided into a plurality of sections, and the control method is applied to each of the plurality of sections.

* * * * *